US012182624B2

United States Patent
Grabarsky et al.

(10) Patent No.: US 12,182,624 B2
(45) Date of Patent: Dec. 31, 2024

(54) DEVICE, SYSTEM AND METHOD FOR ASSIGNING PORTIONS OF A GLOBAL RESOURCE LIMIT TO APPLICATION ENGINES BASED ON RELATIVE LOAD

(71) Applicant: AMADEUS S.A.S., Biot (FR)

(72) Inventors: Philippe Grabarsky, Perols (FR); Mohamed Wadie Nsiri, Le Cannet (FR)

(73) Assignee: AMADEUS S.A.S., SOPHIA ANTIPOLIS, Biot (FR)

( * ) Notice: Subject to any disclaimer, the term of this patent is extended or adjusted under 35 U.S.C. 154(b) by 450 days.

(21) Appl. No.: 17/178,943

(22) Filed: Feb. 18, 2021

(65) Prior Publication Data
US 2022/0261292 A1    Aug. 18, 2022

(51) Int. Cl.
*G06F 9/50*    (2006.01)

(52) U.S. Cl.
CPC ............ *G06F 9/5061* (2013.01); *G06F 9/505* (2013.01); *G06F 9/5083* (2013.01); *G06F 9/5027* (2013.01)

(58) Field of Classification Search
CPC .................................................. G06F 9/5061
See application file for complete search history.

(56) References Cited

U.S. PATENT DOCUMENTS

| | | | |
|---|---|---|---|
| 8,059,541 B2* | 11/2011 | Karagiannis | H04L 41/14 370/235 |
| 8,706,798 B1* | 4/2014 | Suchter | H04L 47/83 709/224 |
| 9,690,622 B1* | 6/2017 | Argenti | G06F 9/5027 |
| 2003/0023596 A1* | 1/2003 | Boudreau | G06F 16/252 707/999.009 |
| 2004/0213395 A1* | 10/2004 | Ishii | H04L 47/18 379/201.01 |
| 2008/0148271 A1* | 6/2008 | Leckie | G06F 9/5027 718/104 |

(Continued)

FOREIGN PATENT DOCUMENTS

| | | |
|---|---|---|
| EP | 4016299 A1 | 6/2022 |
| WO | WO-2020148342 A1 | 7/2020 |

OTHER PUBLICATIONS

Yuan, Tian et al., "A Multi-Cloud and Multi-Cluster Architecture with Kubernetes." Alibaba Cloud Community, Nov. 13, 2019. URL:https://www.alibabacloud.com/blog/a-multi-cloud-and-multi-cluster-architecture-with-kubernetes_595541.

*Primary Examiner* — Meng Al T An
*Assistant Examiner* — Zujia Xu
(74) *Attorney, Agent, or Firm* — PERRY + CURRIER, INC.

(57) ABSTRACT

A device, system and method for assigning portions of a global resource limit to application engines based on relative load is provided. A system comprises a plurality of application engines that share a global resource limit; and a plurality of operator engines. The plurality of operator engines are each configured to: monitor a respective metric representative of respective load at a respective application engine; share the respective metric with others of the plurality of operator engines; determine a relative load at the respective application engine based on the respective metric and respective metrics received from the others of the plurality of operator engines; and assign a portion of the global resource limit to the respective application engine based on the relative load.

20 Claims, 5 Drawing Sheets

(56) References Cited

U.S. PATENT DOCUMENTS

| | | | |
|---|---|---|---|
| 2009/0180388 A1* | 7/2009 | Verchere | H04L 45/02 370/238 |
| 2009/0265450 A1* | 10/2009 | Helmer | H04L 41/0893 709/221 |
| 2012/0331113 A1* | 12/2012 | Jain | H04L 47/803 709/220 |
| 2015/0143367 A1* | 5/2015 | Jia | G06F 9/45558 718/1 |
| 2015/0149233 A1* | 5/2015 | Chaudhary | G06Q 10/06315 705/7.25 |
| 2015/0242874 A1* | 8/2015 | Voigt | G06Q 30/0214 705/14.16 |
| 2017/0214759 A1* | 7/2017 | Timiskov | H04L 67/56 |
| 2017/0251347 A1* | 8/2017 | Mehta | H04W 76/50 |
| 2020/0007563 A1* | 1/2020 | Leibman | H04L 63/1425 |
| 2020/0014609 A1 | 1/2020 | Hockett et al. | |
| 2020/0097268 A1* | 3/2020 | Olsson | G06F 8/38 |
| 2020/0287962 A1 | 9/2020 | Mishra et al. | |
| 2020/0329098 A1* | 10/2020 | Boddam | G06F 11/3692 |
| 2022/0271987 A1* | 8/2022 | McCallen | H04L 43/20 |

\* cited by examiner

DEVICE, SYSTEM AND METHOD FOR ASSIGNING PORTIONS OF A GLOBAL RESOURCE LIMIT TO APPLICATION ENGINES BASED ON RELATIVE LOAD

BACKGROUND

In container-orchestrated environments (COEs), and the like, associated applications may all be attempting to use a same hardware resource, such as the associated applications requesting database connections with a database. As such, a resource pooling application may be used with associated applications to manage requests to the database. However, as the associated applications, along with an associated pooling application are scaled, for example by adding instances thereof in a container-orchestrated environment, the plurality of instances of the associated applications, and/or the associated pooling application, may result in many requests, and the like, to use the same hardware resource, which may cause operation of the hardware resource to decline and/or slowdown, and the like, which may result in an overall drop in efficiency in processing the attempts to use the hardware resource.

SUMMARY

An aspect of the present specification provides a system comprising: a plurality of application engines that share a global resource limit; a plurality of operator engines each configured to: monitor a respective metric representative of respective load at a respective application engine; share the respective metric with others of the plurality of operator engines; determine a relative load at the respective application engine based on the respective metric and respective metrics received from the others of the plurality of operator engines; and assign a portion of the global resource limit to the respective application engine based on the relative load.

At the system of the first aspect, the global resource limit may comprise one or more of a given number of database connections and a hardware-based limit.

At the system of the first aspect, the plurality of operator engines may each be configured to assign the portion of the global resource limit to the respective application engine based on the relative load by providing a value representative of the portion of the global resource limit to the respective application engine.

At the system of the first aspect, at least the plurality of application engines may be provided in a container orchestrated environment, such that a number of the plurality of application engines increase and decrease according to demand.

At the system of the first aspect, the plurality of operator engines may share the respective metric with the others of the plurality of operator engines as a number of the plurality of application engines or the plurality of operator engines increase and decrease.

At the system of the first aspect, the plurality of operator engines may share the respective metric with the others of the plurality of operator engines as the respective load at the respective application engine changes.

At the system of the first aspect, the plurality of operator engines may periodically share the respective metric with the others of the plurality of operator engines.

At the system of the first aspect, the respective metric may comprise transactions per second at the respective application engine.

At the system of the first aspect, the relative load may be determined by dividing the respective metric by a total of respective metrics of the plurality of operator engines.

At the system of the first aspect, the global resource limit may comprise a maximum number of database connections to a database, and each of the plurality of application engines may comprise a respective remote database connection pooling engine configured to consolidate database connection requests for respective associated database lookup engines.

A second aspect of the specification provides a method comprising: monitoring, at an operator engine, a respective metric representative of respective load at a respective application engine, the respective application engine being one of a plurality of application engines that share a global resource limit, the operator engine being one of a plurality of operator engines; sharing, at the operator engine, the respective metric with others of the plurality of operator engines; determining, at the operator engine, a relative load at the respective application engine based on the respective metric and respective metrics received from the others of the plurality of operator engines; and assigning, at the operator engine, a portion of the global resource limit to the respective application engine based on the relative load.

At the method of the second aspect, the global resource limit may comprise one or more of a given number of database connections and a hardware-based limit.

At the method of the second aspect, assigning, at the operator engine, the portion of the global resource limit to the respective application engine based on the relative load may occur by providing a value representative of the portion of the global resource limit to the respective application engine.

At the method of the second aspect, at least the plurality of application engines may be provided in a container orchestrated environment, such that a number of the plurality of application engines increase and decrease according to demand.

At the method of the second aspect, sharing the respective metric with others of the plurality of operator engines may occur as a number of the plurality of application engines or the plurality of operator engines increase and decrease.

At the method of the second aspect, sharing the respective metric with others of the plurality of operator engines may occur as the respective load at the respective application engine changes.

At the method of the second aspect, sharing the respective metric with others of the plurality of operator engines may occur periodically.

At the method of the second aspect, the respective metric may comprise transactions per second at the respective application engine.

At the method of the second aspect, the relative load may be determined by dividing the respective metric by a total of respective metrics of the plurality of operator engines.

At the method of the second aspect, the global resource limit may comprise a maximum number of database connections to a database, and each of the plurality of application engines may comprise a respective remote database connection pooling engine configured to consolidate requested database connection requests for respective associated database lookup engines.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
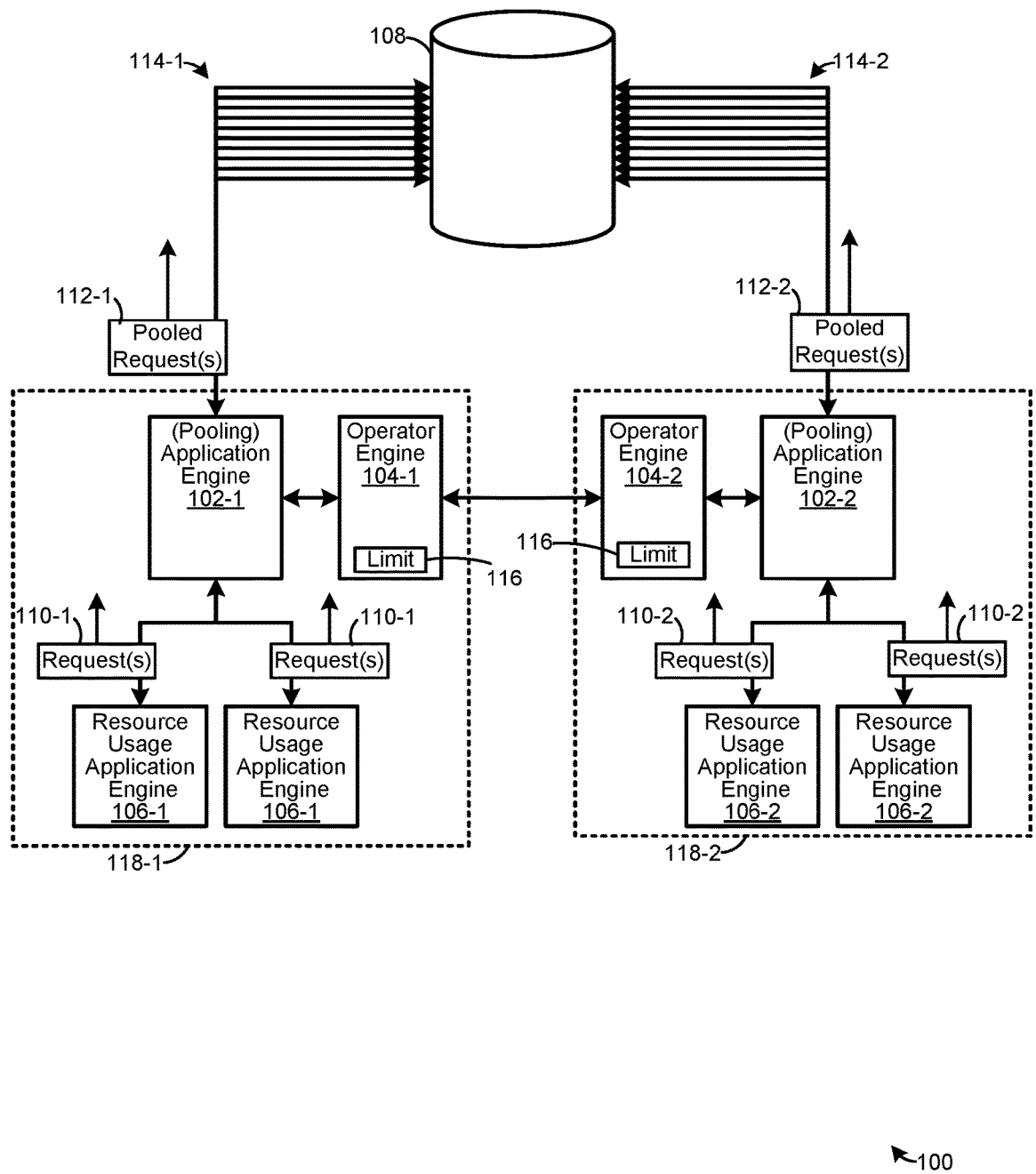
FIG. 1 depicts a system for assigning portions of a global resource limit to application engines based on relative load, according to non-limiting examples.

Attention is directed to FIG. 1 which depicts a system 100 for assigning portions of a global resource limit to application engines based on relative load.

The components of the system 100 are generally in communication via communication links which are depicted in FIG. 1, and throughout the present specification, as double-ended arrows between respective components. The communication links includes any suitable combination of wireless and/or wired communication networks and, similarly, the communication links may include any suitable combination of wireless and/or wired links.

The system 100 will furthermore be described with respect to engines. As used herein, the term "engine" refers to hardware (e.g., a processor, such as a central processing unit (CPU) an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

A system 100 comprises a plurality of application engines 102-1, 102-2 that share a global resource limit, described in more detail below. The plurality of application engines 102-1, 102-2 are interchangeably referred to herein, collectively, as the application engines 102 and, generically, as an application engine 102. This convention will be used elsewhere in the specification. Furthermore, while the system 100 is described with respect to two application engines 102, the system 100 may comprise any suitable number of application engines 102 that may be larger than "2".

The system 100 further comprises a plurality of operator engines 104-1, 104-2 (e.g. operator engines 104 and/or an operator engine 104) which, as depicted, may be in a one-to-one relationship with the plurality of application engines 102; alternatively, one operator engine 104 may be associated with more than one application engine 102. Hence, the system 100 may include a same number of operator engines 104 as application engines 102 (e.g. which may be greater than "2" operator engines 104 and/or application engines 1002), or the system 100 may include a smaller number of operator engines 104 as application engines 102. In general, however, the system 100 includes any suitable number of operator engines 104 and/or application engines 102. Operation of the operator engines 104 are described below.

As depicted, the system 100 further comprises, for each application engine 102, a plurality of resource usage application engines 106-1 (e.g. associated with the application engine 102-1) or resource usage application engines 106-2 (e.g. associated with the application engine 102-2). The resource usage application engines 106-1, 106-2 are interchangeably referred to herein, collectively, as the resource usage application engines 106 and, generically, as a resource usage application engines 106.

In particular, the resource usage applications engines 106 may be used to access a hardware resource 108, for example, as depicted, a database.

As depicted, the application engines 102 may comprise resource pooling engines (e.g. "Pooling" applications in FIG. 1) which, for example, receive respective requests 110 from respective resource usage applications engines 106, and pool the requests 110, to submit to the hardware resource 108 as respective pooled requests 112-1, 112-2 (e.g. pooled requests 112 and/or a pooled request 112) using, for example, connections 114-1, 114-2 (e.g. connections 114 and/or a connection 114) to the hardware resource 108. It is understood that a pooled request 112 generally comprises one or more requests 110 such that a pooled request 112 may comprise combined and/or bundled requests 110 with an application engine 102 configured accordingly. A pooled request 112 may hence be of a format compatible with combining and/or bundling requests 110 (though the requests 110, 112 may be of a same format). Furthermore, a pooled request 112 may comprise combined and/or bundled requests from different resource usage application engines 106.

In a particular example, components of the system 100 may generally be associated with, and/or operated by an entity, such as a company, and the like, that may provide computer-based services, and in particular computer-based services for the travel industry, via the system 100. For example, terminals (not depicted) at travel agencies, airports, airline offices, and the like, and/or computing devices of consumers, may access the resource usage applications engines 106 via a network, and the like, such as the Internet, for example via a browser, and the like, and/or a special purpose application, and the resource usage applications engines 106 may comprise instances of websites, and the like, for providing search fields, and the like, for performing searches for travel information (e.g. plane schedules, availability on particular routes, and the like, though such travel information may include any suitable travel information associated with hotels, trains, buses, car rentals, and the like). A request 110 may hence comprise a request for travel information, and the like, which may be used to search the database of the hardware resource 108, which may comprise a database of travel information and the like. As many instances of the resource usage applications engines 106 may be active at any given time, the requests 110 may be pooled by the application engines 102 as the pooled requests 112, and a number of the requests 110 may be in the millions or higher, though the number of the requests 110 may be any suitable number.

While not depicted, the database of the hardware resource 108 is understood to comprise one or more servers and/or computing devices, and the like, which store information of the database, as well as process and return, to the application engines 102 responses to the pooled requests 112; the application engines 102 may then return a response from the hardware resource to a respective resource usage application engines 106 which originated a request 110 that resulted in the response. For example, such response may include travel information requested via a request 110.

However, the hardware resource 108 may have an associated global resource limit 116 which may include, but is not limited to, a maximum number of the connections 114.

Hence, in examples where the hardware resource 108 comprises a database, and the global resource limit 116 comprises a maximum number of database connections 114 to the database, requests 110 may comprise database lookup requests, and the resource usage applications engines 106 may comprise database lookup engines, each of the plurality of application engines 102 may comprises a respective remote database connection pooling engine which pools database lookup requests from the database lookup engines.

For example, a database (e.g. hardware of a computing device implementing the database) may be able to process (and/or handle, and the like), only a given number of connections 114 at any given time. As such, when more connections 114 are needed to process the pooled requests 112 than are available, and/or the application engines 102 may attempt to open more connections 114 than are available, the database of the hardware resource 108 may operate inefficiently which may slow processing of received pooled requests 112, which may lead to an overall slowdown of the system 100.

However, while present examples are described with respect to a database and/or connections 114 thereto, in other examples, the global resource limit 116 may comprise any suitable hardware-based limit. For example, the application engines 102 may attempt to access hardware based ports at a computing device (e.g. of the hardware resource 108) and the global resource limit 116 may comprise a number of such ports. Indeed, a maximum number of connections 114 may also be understood to be hardware based, as many database systems are limited to a given number of connections per processor core being used to implement a database. As such, the global resource limit 116 may comprises one or more of a given number of database connections and/or any other suitable hardware-based limit.

As such, the operator engines 104 are preconfigured with the global resource limit 116 (e.g. stored at respective memories thereof) and the operator engines 104 may be configured to: monitor a respective metric representative of respective load at a respective application engine 102; share the respective metric with others of the plurality of operator engines 104; determine a relative load at the respective application engine 102 based on the respective metric and respective metrics received from the others of the plurality of operator engines 104; and assign a portion of the global resource limit 116 to the respective application engine 102 based on the relative load. Such assignment will be described in further detail below, however, in general, an operator engine 104 may provide an indication of a determined portion of the global resource limit 116 to a respective application engine 102 (e.g. via a communication link therebetween, and the like) such that the respective application engine 102 limits itself to using the determined portion of the global resource limit 116.

Hence, as depicted, the operator engines 104 are in communication with a respective application engine 102, and also in communication with other operator engines 104.

Prior to further discussing operation of the operator engines 104, further aspects of the system 100 are next described.

In particular, the application engines 102, the resource usage engines 106 (and optionally the operator engines 104) may be implemented in a container-orchestrated environment (COE) in which different instances 118-1, 118-2 (e.g. instances 118 and/or an instance 118, and which may be larger than two instances 118) of associated application engines 106, operator engines 104, and resource usage engines 106 may increase or decrease based on demand. Put another way, the plurality of application engines 102 (and optionally the plurality of operator engines 104) (e.g., and similarly the associated application engines 106) may be provided in a container-orchestrated environment, such that a number of the plurality of application engines 102 (and optionally the plurality of operator engines 104) (e.g., and similarly the associated application engines 106) may increase and decrease according to demand. However, while the operator engines 104 are depicted as being a component of a respective instance 118, and hence may scale up or down with the instances, in other examples the operator engines 104 may not scale up or down and/or may scale up or down independent of the instances 118 such that one operator engine 104 may: monitor a respective metric representative of respective load at a plurality of respective application engines 102; share the respective metric of the respective load of the plurality of respective application engines 102 with others of the plurality of operator engines 104; determine respective relative loads of the plurality of respective application engines 102 based on the respective metrics, and other respective metrics received from the others of the plurality of operator engines 104; and assign respective portions of the global resource limit 116 to the plurality of respective application engines 102 based on the respective relative loads.

Hence, while not depicted, the system 100 may include a container-orchestrated environment (COE) engine, and the like, to manage a number of the instances 118 as demand for the application engines 102 and/or the resource usage engines 106 changes. Such a COE engine may generally execute a plurality of instances of an application, which may change (e.g. increase or decrease) as demand changes, which may be referred to as auto-scaling of an application.

Hence, while in the depicted example there are at least two instances 118 of associated application engines 102, operator engines 104, and resource usage engines 106 are depicted, a number of the instances 118 may increase (e.g. to greater than two) or decrease (e.g. to at least two).

Alternatively, and/or in addition, the application engines 102 and the resource usage engines 106 may be implemented in a Platform-as-a-service (PaaS) environment, which may be implemented via a COE environment. The operator engines 104 may be also be implemented in a PaaS environment which may be a same, or different, PaaS environment as the application engines 102 and the resource usage engines 106.

In some examples, while the two resource usage engines 106 are depicted for each instance 118, in a COE, a number of the resource usage engines 106 for a particular instance may also increase or decrease as demand changes.

Hence, as depicted, while two resource usage application engines 106 are depicted as being in communication with each application engine 102, as few as one resource usage application engine 106 may be in communication with a respective application engine 102, or more than two resource usage application engines 106 may be in communication with a respective application engine 102.

In yet further examples, functionality of the application engine 102 and respective resource usage application engines 106 may be combined.

Regardless, of the number of instances 118, etc., and the number of operator engines 104, it is understood that the operator engines 104 are all in communication with each other such that the operator engines 104 may share, with each other, metrics of respective application engines 102 which represent respective load on respective application engines 102, such as a number of requests 110 per unit time that is being received at a respective application engine 102, among other possibilities, including, but not limited to, a number of transactions per second at a respective application engine 102. However, it is understood that the operator engines 104 may communicate with each other in any suitable manner which may include transmission of metrics of respective application engines 102 to other operator engines 104 via suitable communication links, storage of such metrics at one or more databases accessible by the operator engines 104 and/or any other suitable process for communicating.

For example, a transaction may comprise a request 110 and/or, more generically, a transaction may comprise any suitable demand (including, but not limited to, a demand and/or request for usage of hardware resources) placed on a respective application engine 102, for example by the resource usage application engines 106.

However, other metrics of respective application engines 102 which represent respective load on respective application engines 102 are within the scope of the present specification including, but not limited to, a number of pooled requests 112, and the like, in a queue, an average wait time of a request 112, and the like, in a queue (e.g. before being transmitted to the hardware resource 108), and the like. For example, as a number of transactions per second increase, a number of number of pooled requests 112, and the like, increases, and/or as an average wait time of a request 112, and the like, in a queue increases, a load at a respective application engines 102 is understood to increase.

Hence, in general, a respective metric of a first application engine 102 may be compared to a same type of respective metric of a second application engine 102 to determine relative load therebetween, and/or a respective metric of a first application engine 102 may be compared to a total of the respective metrics of all the application engine 102 to determine relative load therebetween.

In yet further examples, a combination of respective metrics may be used, and/or such respective metrics may be combined in weighted manner to determine relative load between the application engines 102.

Regardless of a type of a respective metric representative of respective load at a respective application engine 102, the operator engines 104 may share such respective metrics (i.e. the operator engines 104 are understood to share a same type of respective metric). A given operator engine 104 may determine relative load of a respective application engine 102, relative to other respective application engine 102, and assign a portion of the global resource limit 116 to the respective application engine 102 based on the relative load.

In a particular example, the global resource limit 116 may comprise 1000 connections 114 to the database of the hardware resource 108. As depicted in FIG. 1, such connections 114 are equally distributed between the application engines 102 (e.g. each of the application engines 102 may use 50% of the connections 114). However, the operator engine 104-1 may determine that the load at the application engine 102-1 is 1500 TPS (e.g. transaction per second), and share this value with the operator engine 104-2. Similarly, the operator engine 104-2 may determine that the load at the application engine 102-2 is 500 TPS (e.g. transaction per second), and share this value with the operator engine 104-1. Hence, the load at the application engine 102-1 is understood to be three times higher than the load at the application engine 102-2. As such, there may be a deficit of connections 114-1 at the application engine 102-1 and a surplus of connections 114-2 at the application engine 102-2.

As such, each of the operator engines 104 may determine that the total load on the application engines 102 is 2000 TPS (e.g. 1500 TPS plus 500 TPS). The operator engine 104-1 may use the total load, and the load of 1500 TPS at the application engine 102-1, to determine that the relative load on the application engine 102-1 is 0.75 (e.g. 1500 TPS divided by 2000 TPS). Similarly, the operator engine 104-2 may use the total load, and the load of 500 TPS at the application engine 102-2, to determine that the relative load on the application engine 102-2 is 0.25 (e.g. 500 TPS divided by 2000 TPS).

Continuing with this example, as mentioned above, the global resource limit 116 may comprise 1000 database connections 114. Hence the operator engine 104-1 may assign a portion of 0.75 of the 1000 database connections 114 of the global resource limit 116 to the respective application engine 102-1, or 750 database connections 114; thereafter, the respective application engine 102-1 will attempt to use a maximum of 750 database connections 114 to transmit the pooled requests 112-1 to the database of the hardware resource 108. Similarly, the operator engine 104-2 may assign a portion of 0.25 of the 1000 database connections 114 of the global resource limit 116 to the respective application engine 102-2, or 250 database connections 114; thereafter, the respective application engine 102-2 will attempt to use a maximum of 250 database connections 114 to transmit the pooled requests 112-2 to the database of the hardware resource 108.

Hence, as illustrated by this example, the relative load of a respective application engine 102 may be determined at an associated operator engine 104, by dividing the respective metric, represented of load of the respective application engine 102 as determined by the associated operator engine 104, by a total of respective metrics of the plurality of operator engines 104.

In a particular example, to assign a portion of the global resource limit 116 to a respective application engine 102, an operator engine 104 may provide a value representative of the portion of the global resource limit 116 to the respective application engine 102. Continuing with the above example, the operator engine 104-1 may provide a value of "750" database connections 114 to the application engine 102-1, and the operator engine 104-2 may provide a value of "250" database connections 114 to the application engine 102-2. Thereafter, the application engines 102 may limit their respective number of connections 114 to a respective received value. Put another way, the application engines 102 may throttle usage of hardware at the hardware resource 108, for example by limiting a number of respective connections 114 to the value representative of a portion of the global resource limit 116, and/or limiting usage of hardware at the hardware resource 108 in any other suitable manner as represented by the value representative of a portion of the global resource limit 116.

Hence, it is further understood that the operator engines 104 generally periodically and/or constantly monitor a respective metric representative of respective load at a respective application engine 102 and, as respective load at a respective application engine 102 changes, the respective metric will change.

As such, the plurality of operator engines 104 may share the respective metric with the others of the plurality of operator engines 104, as the respective load at the respective application engine 102 changes and/or the respective metric changes. In this manner the operator engines 104 may assign an updated portion of the global resource limit 116 to a respective application engine 102 based on the changed relative load and/or the changed relative metric. In other words, changes to the respective metric at a respective application engine 102 may trigger an operator engine 104 to share the respective metric (e.g. the changed respective metric), which may trigger other operator engines 104, which receive the respective metric, to again share their respective metrics, causing all the operator engines 104 to again assign a portion of the global resource limit 116 to respective application engine 102 based on the relative load.

Alternatively, the plurality of operator engines 104 (e.g. all of the plurality of operator engines 104) may periodically share the respective metric with the others of the plurality of operator engines 104 which, when a respective metric determined by one or more operator engines 104 has changed, may cause all the operator engines 104 to again assign a portion of the global resource limit 116 to respective application engine 102 based on the relative load (e.g. an updated relative load). However, when no respective metric has changed, then the portion of the global resource limit 116 assigned to a respective application engine 102 is understood not to change.

In yet further examples, as has already been described, the number of the plurality of application engines 102 and/or the number of operator engines 104 (e.g. and/or the number of instances 188), may increase and decrease. As such, when a new application engine 102 and/or a new operator engine 104 is provided in the system 100, the portions of the global resource limit 116 assigned to the respective application engines 102 is understood to change as the new application engine 102 is understood to require a portion of the global resource limit 116 and/or a new operator engine 104 may be "managing" new application engines 102 and/or management of a portion of existing applications engines 102 may be transferred to the new operator engine 104 (e.g. from another existing operator engine 104). Similarly, when an existing application engine 102 and/or an operator engine 104 is removed from the system 100, the portions of the global resource limit 116 assigned to a respective application engines 102 is understood to change, as the load may be redistributed among the remaining application engines 102, and/or management of a portion of existing applications engines 102 may be transferred from the operator engine 104 being removed to other operator engines 104. As such, in some of these examples, the plurality of operator engines 104 may share the respective metric with others of the plurality of operator engines 104 as a number of the plurality of application engines 102 and/or a number of operator engines 104 increase and decrease, which again causes assigning of a portion of the global resource limit 116 to the respective application engines 102 based on the relative load.

In particular, as mentioned above, without the operator engines 104 communicating such metrics with each other, the application engines 102 may attempt to use any number of connections 114 which, in total, may exceed the maximum number represented by the global resource limit 116. Alternatively, the application engines 102 may be arbitrarily assigned a relative number of connections 114, such as the maximum number represented by the global resource limit 116 divided by the number of the instances 118 and/or the number of the application engines 102 (e.g. as depicted, 50% of the connections 114 to each of the application engines 102), which may cause a surplus of connections 114 at one application engine 102 with low relative load, and a deficit of connections 114 at another application engine 102 with high relative load. Hence, in general, the operator engines 104 attempt to dynamically balance usage of the connections 114 by the application engine 102 based on relative load.

Figure 2:
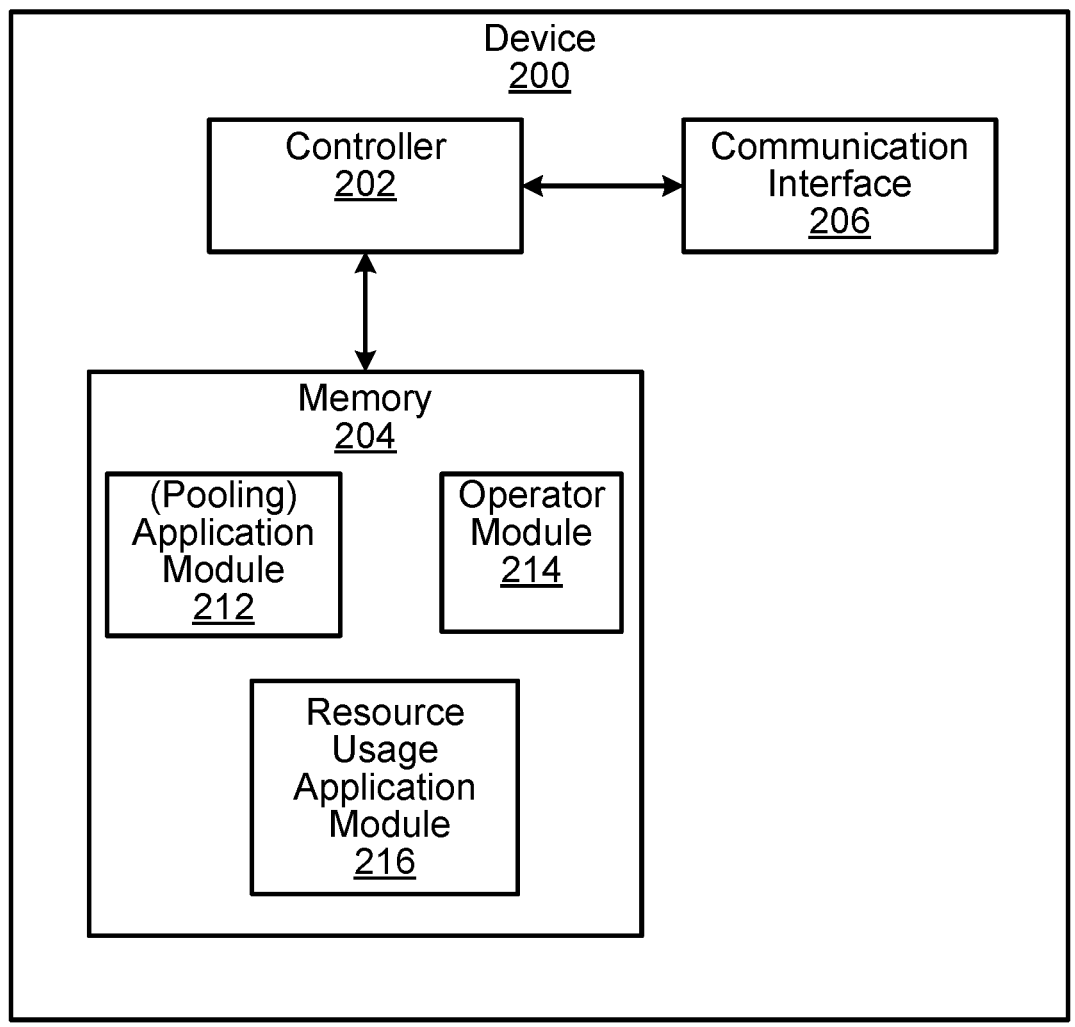
FIG. 2 depicts a device for assigning portions of a global resource limit to application engines based on relative load, according to non-limiting examples.

Attention is next directed to FIG. 2 which depicts a block diagram of an example device 200 that includes a controller 202 communicatively coupled to a memory 204 and a communication interface 206. The device 200 may be generally configured to implement the engines 102, 104, 106 of the system 100, as well as numbers thereof, and/or numbers of the instances 118. It is furthermore understood that the device 200 may be implemented as one or more servers and/or one or more cloud computing devices, with functionality thereof distributed across one or more servers and/or one or more cloud computing devices. As such, instances 118 may be implemented at different cloud computing devices in communication with each other, for example distributed geographically, and which may coordinate implementation of a containerized-orchestrated environment, and/or coordinate implementation of platform-as-a-service environments.

The controller 202 comprise one or more general-purpose processors and/or one or more special purpose logic devices, such as microprocessors (e.g., a central processing unit, a graphics processing unit, etc.), a digital signal processor, a microcontroller, an ASIC, an FPGA, a PAL (programmable array logic), a PLA (programmable logic array), a PLD (programmable logic device), etc.

The controller 202 is interconnected with the memory 204 which may comprise any suitable memory that stores instructions, for example, as depicted, in the form of modules, described below, that, when implemented by the controller 202, cause the controller 202 to implement the engines 102, 104, 106 and/or the instances 118. The memory 204 may be implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 may be generally comprised of one or more integrated circuits (ICs).

The controller 202 is also interconnected with a communication interface 206, which generally enables the device 200 to communicate with the other components of the system 100 via one or more communication links. The communication interface 206 therefore includes any necessary components (e.g. network interface controllers (NICs), radio units, and the like) to communicate with the other components of the system 100 via one or more communication links (e.g. via one or more communication networks). The specific components of the communication interface 206 may be selected based on upon types of the communication links. The device 200 may also include input and output devices connected to the controller 202, such as keyboards, pointing devices, display screens, and the like (not shown).

The memory 204 includes modules. As used herein, a "module" (in some examples referred to as a "software module") is a set of instructions that when implemented or interpreted by a controller and/or a processor, or stored at a processor-readable medium realizes a component or performs a method.

As depicted, the memory 204 includes various modules 212, 214, 216 which respectively correspond to functionality of the engines 102, 104, 106 of the system 100. For example, the controller 202 may implement the application module 212 to implement one or more application engines 102, the controller 202 may implement the operator module 214 to implement one or more operator engines 104 and/or the controller 202 may implement the resource usage application module 216 to implement one or more resource usage application engines 106. While not depicted, the memory 204 may further store a COE module for implementing a COE engine to increase or decrease the instances 118, and the like, based on demand, as described herein.

Figure 3:
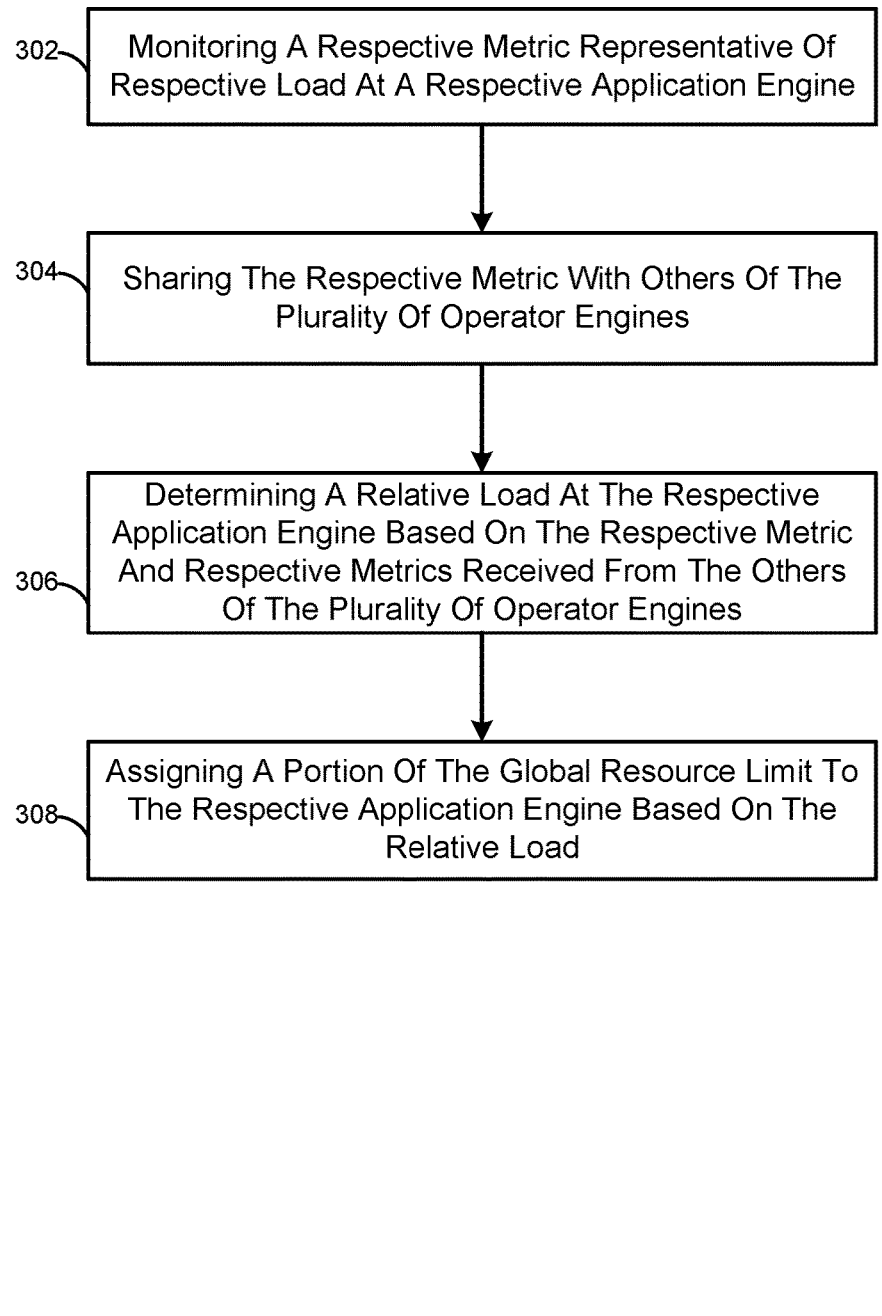
FIG. 3 depicts a method for assigning portions of a global resource limit to application engines based on relative load, according to non-limiting examples.

Attention is now directed to FIG. 3 which depicts a flowchart representative of a method 300 for assigning portions of a global resource limit to application engines based on relative load. The operations of the method 300 of FIG. 3 correspond to machine readable instructions that are executed by the device 200 (e.g. and/or by one or more cloud computing devices), and specifically the controller 202 of the device 200 (and/or by controllers of one or more cloud computing devices). In the illustrated example, the instructions represented by the blocks of FIG. 3 may be stored at the memory 204 for example, at least in part as the operator module 214, though other aspects of the method 300 may be implemented via the other modules 212, 216. The method 300 of FIG. 3 is one way in which the device 200, and/or the controller 202 and/or the system 100 may be configured. However, while the method 300 is specifically described with regards to being implemented by the controller 202 and/or the device 200 and/or an operator engine 104 and/or other engines described herein, it is understood that the method 300 may be implemented by one or more cloud computing devices and/or one or more controllers thereof.

Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 202 and/or the device 200 and/or an operator engine 104 monitors a respective metric representative of respective load at a respective application engine 102. For example, an operator engine 104 may periodically query a respective application engine 102 for a respective metric, as described above, and/or a respective application engine 102 may periodically provide the respective metric to a respective operator engine 104, and/or a respective application engine 102 may provide the respective metric to a respective operator engine 104 when the respective metric changes, and the like, among other possibilities.

As previously mentioned, in a specific example, the respective metric may comprise transactions per second at the respective application engine 102, and/or any other suitable metric of respective load at the respective application engine 102, as described herein.

At a block 304, the controller 202 and/or the device 200 and/or the operator engine 104 shares the respective metric with others of the plurality of operator engines 104. For example, an operator engine 104 may transmit the respective metric to others of the plurality of operator engines 104 via respective communication links and/or via any other suitable mechanism, such as mechanisms used within container orchestrated environments.

At a block 306, the controller 202 and/or the device 200 and/or the operator engine 104 determines a relative load at the respective application engine 102 based on the respective metric and respective metrics received from the others of the plurality of operator engines 104.

As previously mentioned, in a specific example, the relative load may be determined by dividing the respective metric by a total of respective metrics of the plurality of operator engines 104. However, the relative load may be determined using the respective metric and respective metrics received from the others of the plurality of operator engines 104 in any suitable manner. For example, ratios between the respective metric and the respective metrics received from the others of the plurality of operator engines 104 may be used to determine relative load; regardless, however, the relative load at the respective application engine 102, as based on the respective metric and respective metrics received from the others of the plurality of operator engines 104, is understood to be relative to a total load at the application engines 102.

At a block 308, the controller 202 and/or the device 200 and/or the operator engine 104 assigns a portion of the global resource limit 116 to the respective application engine 102 based on the relative load.

As has already been described, at the method 300, the operator engine 104 may be configured to assign the portion of the global resource limit 116 to the respective application engine 102 based on the relative load by providing a value representative of the portion of the global resource limit 116 to the respective application engine 102.

As has already been described, at the method 300, the global resource limit 116 may comprise one or more of a given number of database connections 114 and a hardware-based limit.

Hence, a respective application engine 102, upon receiving, from an operator engine 104, a value representative of a portion of the global resource limit 116, may responsively throttle usage of hardware at the hardware resource 108, for example by limiting a number of respective connections 114 to the value representative of a portion of the global resource limit 116, and/or limiting usage of hardware at the hardware resource 108 in any other suitable manner as represented by the value representative of a portion of the global resource limit 116.

Other features described herein may be implemented via the method 300. For example, the plurality of application engines 102 and the plurality of operator engines 104 may be provided in a container orchestrated environment, such that the method 300 may further comprise the controller 202 and/or the device 200 and/or a COE engine increasing and decreasing a number of the plurality of application engines 102 and the plurality of operator engines 104 according to demand.

In other examples, the method 300 may further comprise the controller 202 and/or the device 200 and/or the operator engine 104 sharing the respective metric (e.g. at the block 304) with the others of the plurality of operator engines 104 as a number of the plurality of operator engines 104 increase and decrease.

In other examples, the method 300 may further comprise the controller 202 and/or the device 200 and/or the operator engine 104 sharing the respective metric e.g. at the block 304) with the others of the plurality of operator engines 104 as the respective load at the respective application engine 102 changes.

In yet further examples, the method 300 may further comprise the controller 202 and/or the device 200 and/or the operator engine 104 periodically sharing the respective metric e.g. at the block 304) with the others of the plurality of operator engines 104.

A specific example of the method 300 will next be described with respect to FIG. 4 and FIG. 5, which are substantially similar to FIG. 1, with like components having like numbers.

Figure 4:
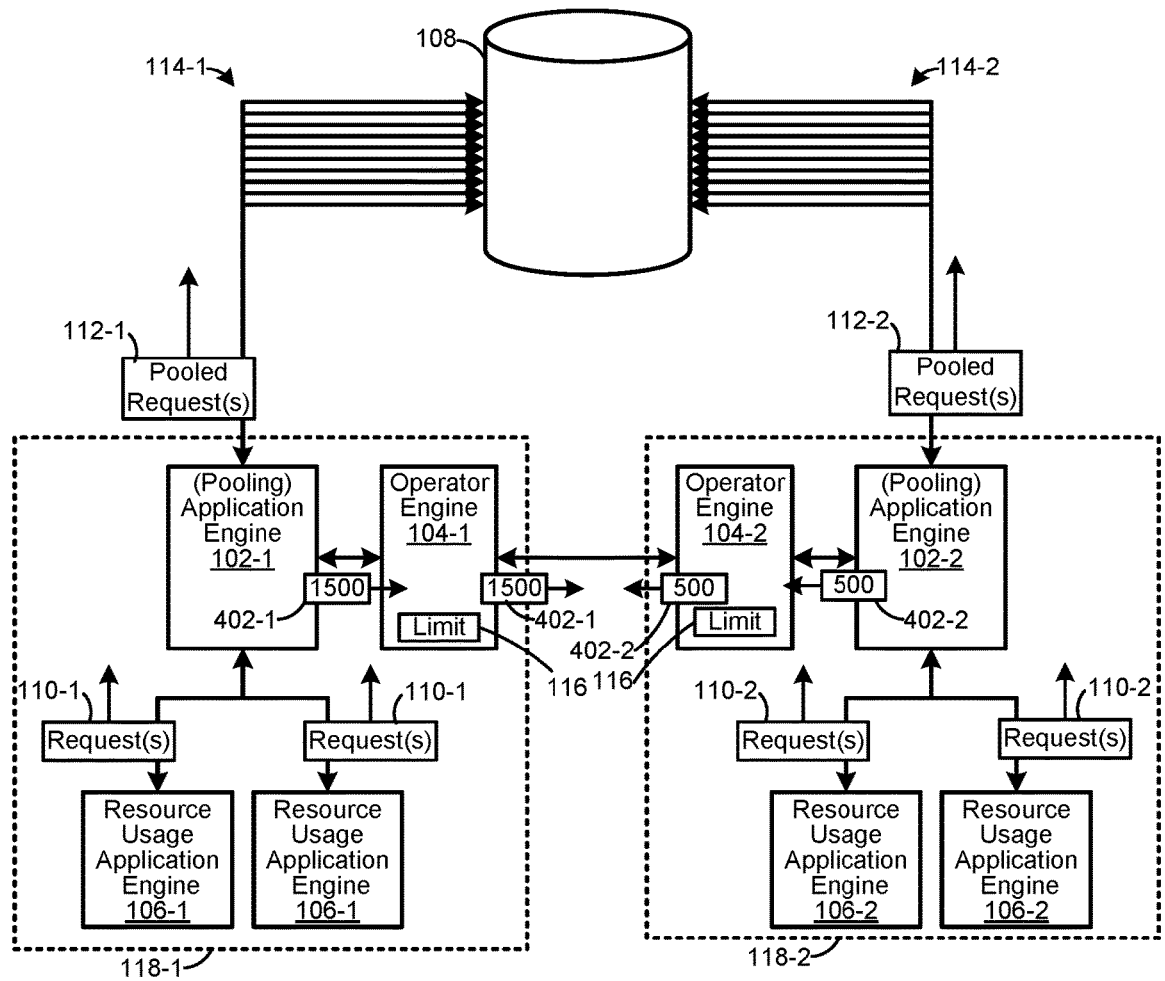
FIG. 4 depicts operator engines of the system of FIG. 1 exchanging respective metrics representative of respective load at respective application engines, according to non-limiting examples.

With attention first directed to FIG. 4, the operator engines 104 are understood to be monitoring (e.g. at the block 302 of the method 300) a respective metric 402-1, 402-2 (e.g. a metric 402) representative of respective load at a respective application engine 102, for example by receiving the metric 402 from a respective application engine 102 on request and/or as initiated by a respective application engine 102. For example, the metric 402-1 received at the operator engine 104-1 may comprise 1500 transactions per second at the application engine 102-1, and the metric 402-2 received at the operator engine 104-2 may comprise 500 transactions per second at the application engine 102-2.

As also depicted in FIG. 4, the operator engines 104 share (e.g. at the block 304 of the method 300) a respective metric 402 with other operator engines 104. For example, as depicted, the operator engine 104-1 provides the metric 402-1 of "1500" transactions per second with the operator engine 104-2, and the operator engine 104-2 provides the metric 402-2 of "500" transactions per second with the operator engine 104-1.

Figure 5:
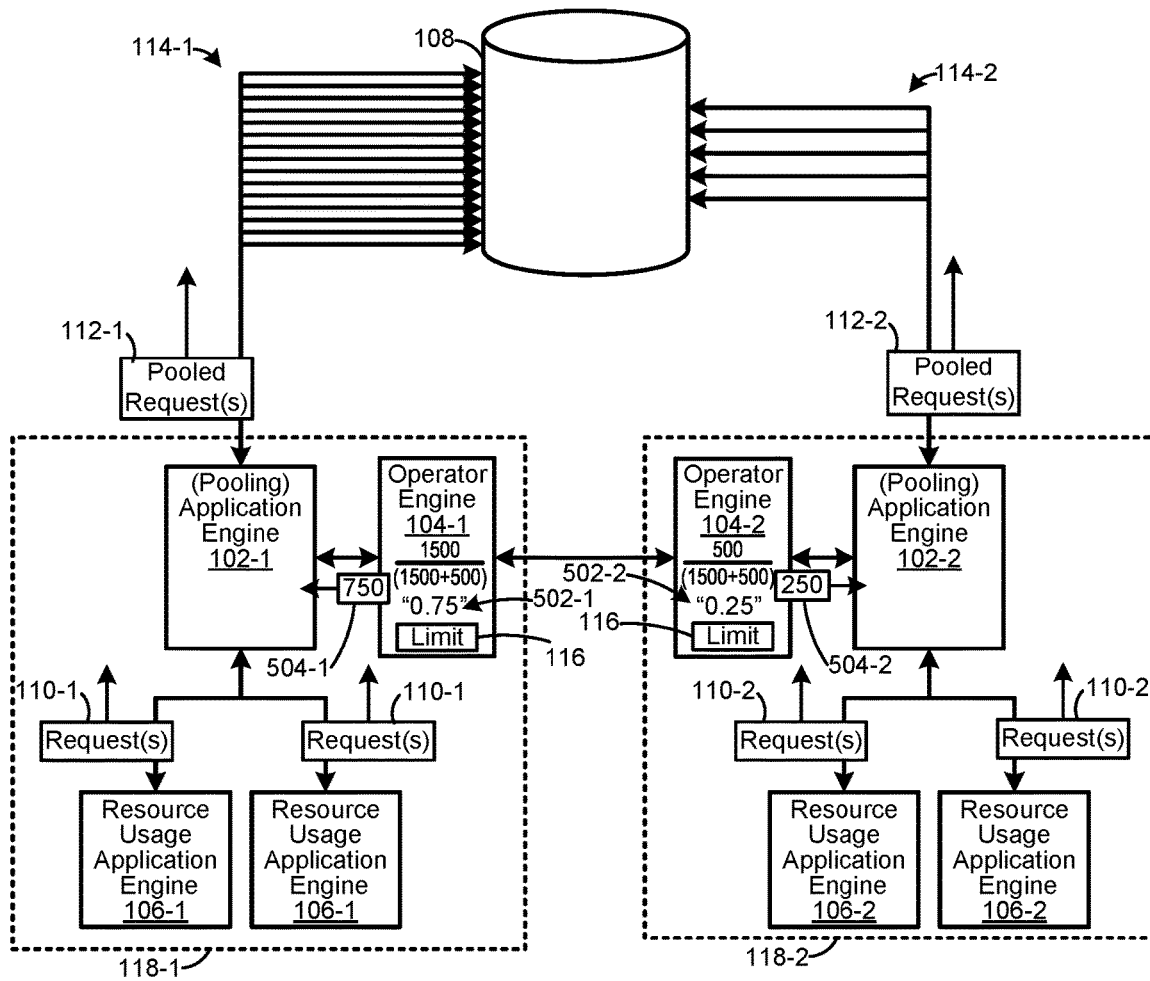
FIG. 5 depicts application engines of the system of FIG. 1 throttling usage of a hardware resource according to portions of a global resource limit assigned thereto by the operator engines, the portions based on the relative load, according to non-limiting examples.

As depicted in FIG. 5, the operator engines 104 determine (e.g. at the block 306 of the method 300) a relative load 502-1, 502-2 (e.g. relative load 502) at the respective application engines 102 based on the respective metric 402 and respective metrics 402 received from the others of the plurality of operator engines 104.

For example, as depicted, the operator engine 104-1 divides the metric 402-1 of "1500" with a total of the metric 402-1 of "1500" and the metric 402-2 of "500", for example to determine that the relative load 502-1 at the application engine 102-1 is "0.75" of the total load (e.g. 1500/(1500+500)=1500/2000=0.75).

Similarly, as depicted, the operator engine 104-2 divides the metric 402-2 of "500" with a total of the metric 402-1 of "1500" and the metric 402-2 of "500", for example to determine that the relative load 502-2 at the application engine 102-2 is "0.25" of the total load (e.g. 500/(1500+500)=500/2000=0.25).

The operator engines 104 then assign (e.g. at the block 308 of the method 300) a portion 504-1, 504-2 (e.g. portion 504) of the global resource limit 116 to a respective application engine 102 based on the relative load 502.

For example, assuming that the global resource limit 116 comprises 1000 connections 114, as depicted, the operator engine 104-1 multiples the relative load 502-1 of "0.75" of the application engine 102-1 by the global resource limit 116 to determine that the portion 504-1 of the connections 114 of the application engine 102-1 is "750" connections.

Similarly, as depicted, the operator engine 104-2 multiples the relative load 502-2 of "0.25" of the application engine 102-2 by the global resource limit 116 to determine that the portion 504-2 of the connections 114 of the application engine 102-2 is "250" connections.

The operator engines 104 provide the portions 504 to their respective application engines 102, and the application engines 102 respond by adjusting their connections accordingly. For example, as depicted, the application engine 102-1 increases a number of the connections 114-1 to 750, and the application engine 102-2 increases a number of the connections 114-2 to 250.

It is understood that the process shown in FIG. 4 and FIG. may be repeated as load at the application engines 104 change such that the number of connections 114 used by a respective application engine 104 may generally correspond to a relative load thereof.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with digital projectors, digital cameras, RAM or other digital storage, cannot transmit or receive electronic messages, such as a requests and/or the information exchanged between the engines described herein, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A system comprising:
    at least one processor;
    a database hardware resource comprising an associated global resource limit;
    a plurality of instances of at least one respective application engine, at least one respective operator engine and a plurality of respective separate resource usage application engines, the at least one processor configured to execute the plurality of instances,
    wherein each application engine of a respective instance of the plurality of instances executed by the at least one processor, is configured to:
        receive respective database hardware usage requests from a plurality of separate resource usage application engines of the respective instance, of the plurality of instances, that includes the application engine,
        pool the respective database hardware usage requests; and
        transmit the pooled respective database hardware usage requests to the database hardware resource;
    wherein all application engines, of the plurality of instances, share the global resource limit;
    wherein each operator engine of the respective instance, of the plurality of instances executed by the at least one processor, is configured to:
        monitor a respective metric representative of respective load at a respective application engine at the respective instance, of the plurality of instances, that includes the operator engine;
        share the respective metric with other operator engines of different instances of the plurality of instances;
        determine a portion of total load at the respective application engine based on the respective metric of the operator engine and the respective metrics received from the other operator engines; and
        assign a portion of the global resource limit to the respective application engine based on the portion of total load; and
    wherein the at least one processor is further configured to activate and deactivate some application engines and operator engines in response to changes in a demand of the database hardware usage requests sent from the plurality of separate resource usage application engines to at least one application engine in the respective instance, thereby inhibiting slowdowns in the database hardware resource that is responding to the database hardware usage requests.

2. The system of claim 1, wherein the global resource limit comprises one or more of a given number of database connections and a hardware-based limit.

3. The system of claim 1, wherein the operator engine of the respective instance is further configured to assign the portion of the global resource limit to the respective application engine of the respective instance based on the portion of total load by providing a value representative of the portion of the global resource limit to the respective application engine.

4. The system of claim 1, wherein at least the application engines are provided in a container orchestrated environment.

5. The system of claim 1, wherein the operator engine of the respective instance shares the respective metric with the others of the operator engines as a number of the application engines or the operator engines increase and decrease.

6. The system of claim 1, wherein the operator engine of the respective instance shares the respective metric with the others of the operator engines as the respective load at the respective application engine changes.

7. The system of claim 1, wherein the operator engines periodically shares the respective metric with the others of the operator engines.

8. The system of claim 1, wherein the respective metric comprises transactions per second at the respective application engine.

9. The system of claim 1, wherein the portion of total load is determined by dividing the respective metric by a total of respective metrics of the operator engines.

10. The system of claim 1, wherein the global resource limit comprises a maximum number of database connections to a database, and each of the application engines comprises a respective remote database connection pooling engine configured to consolidate requested database connection requests for respective associated database lookup engines.

11. A method, comprising:
    providing a database hardware resource comprising an associated global resource limit;
    providing a plurality of instances of at least one respective application engine, at least one respective operator engine and a plurality of respective separate resource usage application engines;
    monitoring, at a respective operator engine of a respective instance of the plurality of instances, a respective metric representative of respective load at a respective application engine of the respective instance, the respective application engine shares the associated global resource limit of the database hardware resource,
    wherein each application engine of the respective instance, and for each of the plurality of instances:
        receives respective database hardware usage requests from a plurality of separate resource usage application engines of the respective instance, pools the respective database hardware usage requests; and transmits the pooled respective database hardware usage requests to the database hardware resource;

sharing, at the respective operator engine of the respective instance, the respective metric with other operator engines of different instances of the plurality of instances;

determining, at the respective operator engine of the respective instance, a portion of total load at the respective application engine of the respective instance based on the respective metric of the respective operator engine and respective metrics received from other operator engines of the different instances;

assigning, at the respective operator engine of the respective instance, a portion of the global resource limit to the respective application engine of the respective instance based on the portion of total load;

determining changes in a demand of the database hardware usage requests placed on the respective application engine of the respective instance; and activating and deactivating, via at least one processor, some of application engines and some of operator engines in response to the changes in the demand of database hardware usage requests sent from the plurality of separate resource usage application engines to at least one application engine of the respective instance, thereby inhibiting slowdowns in the database hardware resource that is responding to the database hardware usage requests.

12. The method of claim 11, wherein the global resource limit comprises one or more of a given number of database connections and a hardware-based limit.

13. The method of claim 11, wherein assigning, at the respective operator engine, the portion of the global resource limit to the respective application engine based on the portion of total load occurs by providing a value representative of the portion of the global resource limit to the respective application engine.

14. The method of claim 11, wherein at least the application engines are provided in a container orchestrated environment.

15. The method of claim 11, wherein sharing the respective metric with others of the operator engines occurs as a number of the application engines or the operator engines increase and decrease.

16. The method of claim 11, wherein sharing the respective metric with others of the operator engines occurs as the respective load at the respective application engine changes.

17. The method of claim 11, wherein sharing the respective metric with others of the operator engines occurs periodically.

18. The method of claim 11, wherein the respective metric comprises transactions per second at the respective application engine.

19. The method of claim 11, wherein the portion of total load is determined by dividing the respective metric by a total of respective metrics of the operator engines.

20. The method of claim 11, wherein the global resource limit comprises a maximum number of database connections to a database, and each of the application engines comprises a respective remote database connection pooling engine configured to consolidate requested database connection requests for respective associated database lookup engines.

* * * * *